United States Patent
Hwang et al.

(10) Patent No.: US 9,524,136 B2
(45) Date of Patent: Dec. 20, 2016

(54) IMAGE COMPENSATION METHOD AND DISPLAY WITH IMAGE COMPENSATION

(71) Applicant: SHENZHEN CHINA STAR OPTOELECTRONICS TECHNOLOGY CO., LTD., Shenzhen, Guangdong (CN)

(72) Inventors: Tai-Jiun Hwang, Shenzhen (CN); Pengfei Liang, Shenzhen (CN)

(73) Assignee: SHENZHEN CHINA STAR OPTOELECTRONICS TECHNOLOGY CO., LTD., Guangdon (CN)

( * ) Notice: Subject to any disclaimer, the term of this patent is extended or adjusted under 35 U.S.C. 154(b) by 83 days.

(21) Appl. No.: 14/405,866

(22) PCT Filed: Sep. 12, 2014

(86) PCT No.: PCT/CN2014/086384
§ 371 (c)(1),
(2) Date: Dec. 5, 2014

(87) PCT Pub. No.: WO2016/029514
PCT Pub. Date: Mar. 3, 2016

(65) Prior Publication Data
US 2016/0063682 A1 Mar. 3, 2016

(30) Foreign Application Priority Data
Aug. 27, 2014 (CN) .......................... 2014 1 0429155

(51) Int. Cl.
*G06T 5/00* (2006.01)
*G06T 3/40* (2006.01)
(Continued)

(52) U.S. Cl.
CPC ........ *G06F 3/14* (2013.01); *G09G 5/00* (2013.01); *G09G 2320/0233* (2013.01);
(Continued)

(58) Field of Classification Search
CPC ...... G06T 2210/36; G06T 15/00; G06T 17/20; G06T 15/04; G09G 2340/0407; G09G 5/391; G09G 2340/0457; G09G 5/227; G09G 5/006; G09G 2340/0421; G09G 2340/0414
See application file for complete search history.

(56) References Cited

U.S. PATENT DOCUMENTS 5,550,443 A 8/1996 Lee
8,558,876 B2 * 10/2013 Lazarski ............ H04N 13/0029
345/698

(Continued)

FOREIGN PATENT DOCUMENTS

CN 102170543 A 8/2011
CN 102918859 A 2/2013
(Continued)

*Primary Examiner* — Todd Buttram
(74) *Attorney, Agent, or Firm* — Sughrue Mion, PLLC

(57) ABSTRACT

An image compensation method is disclosed. The method comprising: detecting a realistic display mode of a display; generating an image compensation data based on the realistic display mode of the display and a preset compensation data; using the image compensation data to execute an image compensation operation to a display image signal; using the realistic display mode of a display to execute a display operation to the display image signal after the image compensation operation. The present invention is able to execute the image compensation operation to the display images of all display modes of the display.

19 Claims, 4 Drawing Sheets

(51) Int. Cl.
*G06F 3/14* (2006.01)
*G09G 5/00* (2006.01)
(52) U.S. Cl.
CPC ............... *G09G 2340/0407* (2013.01); *G09G 2340/0435* (2013.01); *G09G 2340/14* (2013.01)

(56) References Cited

U.S. PATENT DOCUMENTS

| | | | |
|---|---|---|---|
| 2004/0028293 A1* | 2/2004 | Allen | G09G 3/002 382/300 |
| 2006/0274936 A1* | 12/2006 | Ohkubo | G06K 9/00234 382/167 |
| 2007/0206121 A1* | 9/2007 | Yoshida | G06F 3/14 348/630 |
| 2009/0051816 A1* | 2/2009 | Ota | H04N 5/21 348/618 |
| 2010/0195203 A1* | 8/2010 | Zuidema | G02B 3/005 359/463 |
| 2011/0193875 A1 | 8/2011 | Saigo | |
| 2013/0002838 A1 | 1/2013 | Takenaka | |
| 2013/0127841 A1* | 5/2013 | Tachibana | G06T 15/00 345/419 |
| 2014/0009469 A1 | 1/2014 | Shin et al. | |
| 2014/0098114 A1* | 4/2014 | Ju | G06T 9/00 345/520 |

FOREIGN PATENT DOCUMENTS

| | | |
|---|---|---|
| CN | 103546664 A | 1/2014 |
| KR | 10-2010-0001269 A | 1/2010 |

\* cited by examiner

| Row\Column | 1 | 2 | 3 | 4 | N | 3840 |
|---|---|---|---|---|---|---|
| 1 | 1 | 2 | 4 | 3 | X(1)N | X(1)3840 |
| 2 | 2 | 5 | 6 | 4 | X(2)N | X(2)3840 |
| 3 | 1 | 4 | 5 | 5 | X(3)N | X(3)3840 |
| 4 | 1 | 1 | 1 | 1 | X(4)N | X(4)3840 |
| M | X(M)1 | X(M)2 | X(M)3 | X(M)4 | X(M)N | X(M)N |
| 2160 | X(2160)1 | X(2160)2 | X(2160)3 | X(2160)4 | X(2160)N | X(2160)3840 |

Fig. 2A

| Row\Column | 1 | 2 | 3 | 4 | N | 3840 |
|---|---|---|---|---|---|---|
| 1 | 1.25 | 3 | 4 | 3.25 | X(1)N | X(1)3840 |
| 2 | X(2)1 | X(2)2 | X(2)3 | X(2)4 | X(2)N | X(2)3840 |
| 3 | X(3)1 | X(3)2 | X(3)3 | X(3)4 | X(3)N | X(3)3840 |
| 4 | X(4)1 | X(4)2 | X(4)3 | X(4)4 | X(4)N | X(4)3840 |
| M | X(M)1 | X(M)2 | X(M)3 | X(M)4 | X(M)N | X(M)N |
| 540 | X(540)1 | X(540)2 | X(540)3 | X(540)4 | X(540)N | X(540)3840 |

Fig. 2B

| Row\Column | 1 | 2 | 3 | 4 | N | 3840 |
|---|---|---|---|---|---|---|
| 1 | 1.5 | 3.5 | 5 | 3.5 | X(1)N | X(1)3840 |
| 2 | 1 | 2.5 | 3 | 3 | X(2)N | X(2)3840 |
| 3 | X(3)1 | X(3)2 | X(3)3 | X(3)4 | X(3)N | X(3)3840 |
| 4 | X(4)1 | X(4)2 | X(4)3 | X(4)4 | X(4)N | X(4)3840 |
| M | X(M)1 | X(M)2 | X(M)3 | X(M)4 | X(M)N | X(M)N |
| 1080 | X(1080)1 | X(1080)2 | X(1080)3 | X(1080)4 | X(1080)N | X(1080)3840 |

Fig. 3

| Row\Column | 1 | 2 | 3 | 4 | N | 3840 |
|---|---|---|---|---|---|---|
| 1 | 1 | 2 | 4 | 3 | X(1)N | X(1)3840 |
| 2 | 1 | 4 | 5 | 5 | X(2)N | X(2)3840 |
| 3 | X(3)1 | X(3)2 | X(3)3 | X(3)4 | X(3)N | X(3)3840 |
| 4 | X(4)1 | X(4)2 | X(4)3 | X(4)4 | X(4)N | X(4)3840 |
| M | X(M)1 | X(M)2 | X(M)3 | X(M)4 | X(M)N | X(M)N |
| 1080 | X(1080)1 | X(1080)2 | X(1080)3 | X(1080)4 | X(1080)N | X(1080)3840 |

Fig. 4

| Row\Column | 1 | 2 | 3 | 4 | N | 3840 |
|---|---|---|---|---|---|---|
| 1 | 2 | 5 | 6 | 4 | X(1)N | X(1)3840 |
| 2 | 1 | 1 | 1 | 1 | X(2)N | X(2)3840 |
| 3 | X(3)1 | X(3)2 | X(3)3 | X(3)4 | X(3)N | X(3)3840 |
| 4 | X(4)1 | X(4)2 | X(4)3 | X(4)4 | X(4)N | X(4)3840 |
| M | X(M)1 | X(M)2 | X(M)3 | X(M)4 | X(M)N | X(M)N |
| 1080 | X(1080)1 | X(1080)2 | X(1080)3 | X(1080)4 | X(1080)N | X(1080)3840 |

Fig. 5

IMAGE COMPENSATION METHOD AND DISPLAY WITH IMAGE COMPENSATION

BACKGROUND OF THE INVENTION

Field of Invention

The present invention relates to a field of displays, and in particular to, an image compensation method and a display with image compensation.

Description of Prior Art

Accompanying societal development, people use displays on more and more occasions, as while using computers in an office, communicating with mobile phones, and watching home theater at home. Therefore, people require more and more from the displays.

Stain (mura) is a common problem with displays. Mura can be generated by many things. For example, mixing dust particle while making display cell, lumps of mura might be generated. Manufacturing defects on scan lines or data lines might generate bars of mura, or manufacturing defects on the RGB color resist layer of the color filter baseplate might generate spots of mura on images of a certain color.

Occurrence of a mura phenomenon hugely affects users' normal use so that after finishing production of the display, the display manufacturers will execute a mura detection thereon and use a preset image compensation chip to proceed image compensation for the display image of the display, according to a result of the mura detection, so as to reduce or eliminate the mura phenomenon of the display.

Displays have a fixed resolution rate while displaying a 2D image so that the present displays execute the corresponding image compensation only for 2D display image. However. The displays commonly have various types of 3D display modes. Since the resolution rates of different-type 3D display modes might be different, it is impossible to execute the image compensation for all types of 3D display modes by the same image compensation mode.

Therefore, an image compensation method and a display with image compensation are needed in order to solve the problems in the conventional art.

SUMMARY OF THE INVENTION

An objective of the present invention is to provide an image compensation method and a display with image compensation which are compatible with various 2D or 3D display modes, in order to solve the technical problems of said prior art that the displays could not execute the image compensation to the display images of all display modes of the display.

To achieve the above objective, the present invention provides a technical solution as below.

The present invention provides an image compensation method, comprising:

detecting a realistic display mode of a display through an IO interface of the display;

processing a preset compensation data to generate an image compensation data, based on an image resolution rate of the realistic display mode of the display and an image resolution rate of the preset display mode of the display;

using the image compensation data to execute an image compensation operation to a display image signal; and using the realistic display mode of a display to execute a display operation on the display image signal after the image compensation operation, wherein the preset compensation data is a compensation data of the display image signal of the preset display mode of the display.

In the image compensation method of the present invention, the preset display mode is a 2D display mode, a resolution rate of the 2D display mode of the display is higher than resolution rates of the other display modes.

In the image compensation method of the present invention, while the image resolution rate of the realistic display mode of the display is half that of the image resolution rate of the preset display mode of the display, a mean-value process is executed on the preset compensation data of the display image signal of the preset display mode corresponding to the display image signal of the realistic display mode and thereby generate the image compensation data.

In the image compensation method of the present invention, while the image resolution rate of the realistic display mode of the display is a quarter of that of the image resolution rate of the preset display mode of the display, a mean-value process is executed on the preset compensation data of the display image signal of the preset display mode corresponding to the display image signal of the realistic display mode and thereby generates the image compensation data.

In the image compensation method of the present invention, while the image resolution rate of the realistic display mode of the display is half that of the image resolution rate of the preset display mode of the display, any one of the preset compensation data of the display image signal of the preset display mode corresponding to the display image signal of the realistic display mode is selected as the image compensation data.

The present invention provides another image compensation method, comprising:

detecting a realistic display mode of a display;

generating an image compensation data based on the realistic display mode of the display and a preset compensation data;

using the image compensation data to execute an image compensation operation to a display an image signal;

using the realistic display mode of a display to execute a display operation to the display image signal after the image compensation operation, wherein the preset compensation data is a compensation data of the display image signal of the preset display mode of the display.

In the image compensation method of the present invention, the preset compensation data is a compensation data of the display image signal of the preset display mode of the display.

In the image compensation method of the present invention, the step of generating the image compensation data comprises:

processing the preset compensation data to generate the image compensation data, based on an image resolution rate of the realistic display mode of the display and an image resolution rate of the preset display mode of the display.

In the image compensation method of the present invention, the preset display mode is a 2D display mode, a resolution rate of the 2D display mode of the display is higher than resolution rates of the other display modes.

In the image compensation method of the present invention, while the image resolution rate of the realistic display mode of the display is half that of the image resolution rate of the preset display mode of the display, a mean-value process is executed on the preset compensation data of the display image signal of the preset display mode corresponding to the display image signal of the realistic display mode and thereby generates the image compensation data.

In the image compensation method of the present invention, while the image resolution rate of the realistic display mode of the display is a quarter that of the image resolution rate of the preset display mode of the display, a mean-value process is executed on the preset compensation data of the display image signal of the preset display mode corresponding to the display image signal of the realistic display mode and thereby generates the image compensation data.

In the image compensation method of the present invention, while the image resolution rate of the realistic display mode of the display is half that of the image resolution rate of the preset display mode of the display, any one of the preset compensation data of the display image signal of the preset display mode corresponding to the display image signal of the realistic display mode is selected as the image compensation data.

The present invention further provides a display with image compensation, comprising:

A mode detecting module configured to detect a realistic display mode of the display.

A compensation data generating module configured to generate an image compensation data based on the realistic display mode of the display and a preset compensation data.

A compensation operation module configured to use the image compensation data to execute an image compensation operation on a display image signal.

A display module configured to use the realistic display mode of the display to execute a display operation on the display image signal after the image compensation operation.

In the display with image compensation of the present invention, the preset compensation data is a compensation data of the display image signal of the preset display mode of the display.

In the display with image compensation of the present invention, the compensation data generating module is configured to process the preset compensation data to generate the image compensation data, based on an image resolution rate of the realistic display mode of the display and an image resolution rate of the preset display mode of the display.

In the display with image compensation of the present invention, the preset display mode is a 2D display mode, a resolution rate of the 2D display mode of the display is higher than resolution rates of the other display modes.

In the display with image compensation of the present invention, while the image resolution rate of the realistic display mode of the display is half that of the image resolution rate of the preset display mode of the display, a mean-value process is executed on the preset compensation data of the display image signal of the preset display mode corresponding to the display image signal of the realistic display mode and thereby generates the image compensation data.

In the display with image compensation of the present invention, while the image resolution rate of the realistic display mode of the display is a quarter that of the image resolution rate of the preset display mode of the display, a mean-value process is executed on the preset compensation data of the display image signal of the preset display mode corresponding to the display image signal of the realistic display mode and thereby generates the image compensation data.

In the display with image compensation of the present invention, while the image resolution rate of the realistic display mode of the display is half that of the image resolution rate of the preset display mode of the display, any one of the preset compensation data of the display image signal of the preset display mode corresponding to the display image signal of the realistic display mode is selected as the image compensation data.

In comparison with the image compensation method and the display with image compensation of the prior art, the image compensation method and the display with image compensation of the present invention generates an image compensation data of the realistic display mode based on the realistic display mode of the display and a preset compensation data so that the image compensation operation is capable of being executed on the display images of all display modes of the display, to solve the technical problems of said prior art that the displays could not execute the image compensation to the display images of all display modes of the display.

To allow the present invention to be more clearly understood, preferred embodiments are given below, and accompanied with drawings, and are described in detail as follows:

BRIEF DESCRIPTION OF THE DRAWINGS

FIG. 2A shows a preset compensation data of an image compensation method of the preferred embodiment of the present invention.

FIG. 2B shows a preset compensation data of an image compensation method of the first preferred embodiment of the present invention.

FIG. 3 shows a preset compensation data of an image compensation method of the second preferred embodiment of the present invention.

FIG. 4 shows a preset compensation data of an image compensation method of third preferred embodiment of the present invention.

FIG. 5 shows a preset compensation data of an image compensation method of fourth preferred embodiment of the present invention.

DETAILED DESCRIPTION OF THE PREFERRED EMBODIMENTS

Figure 1:
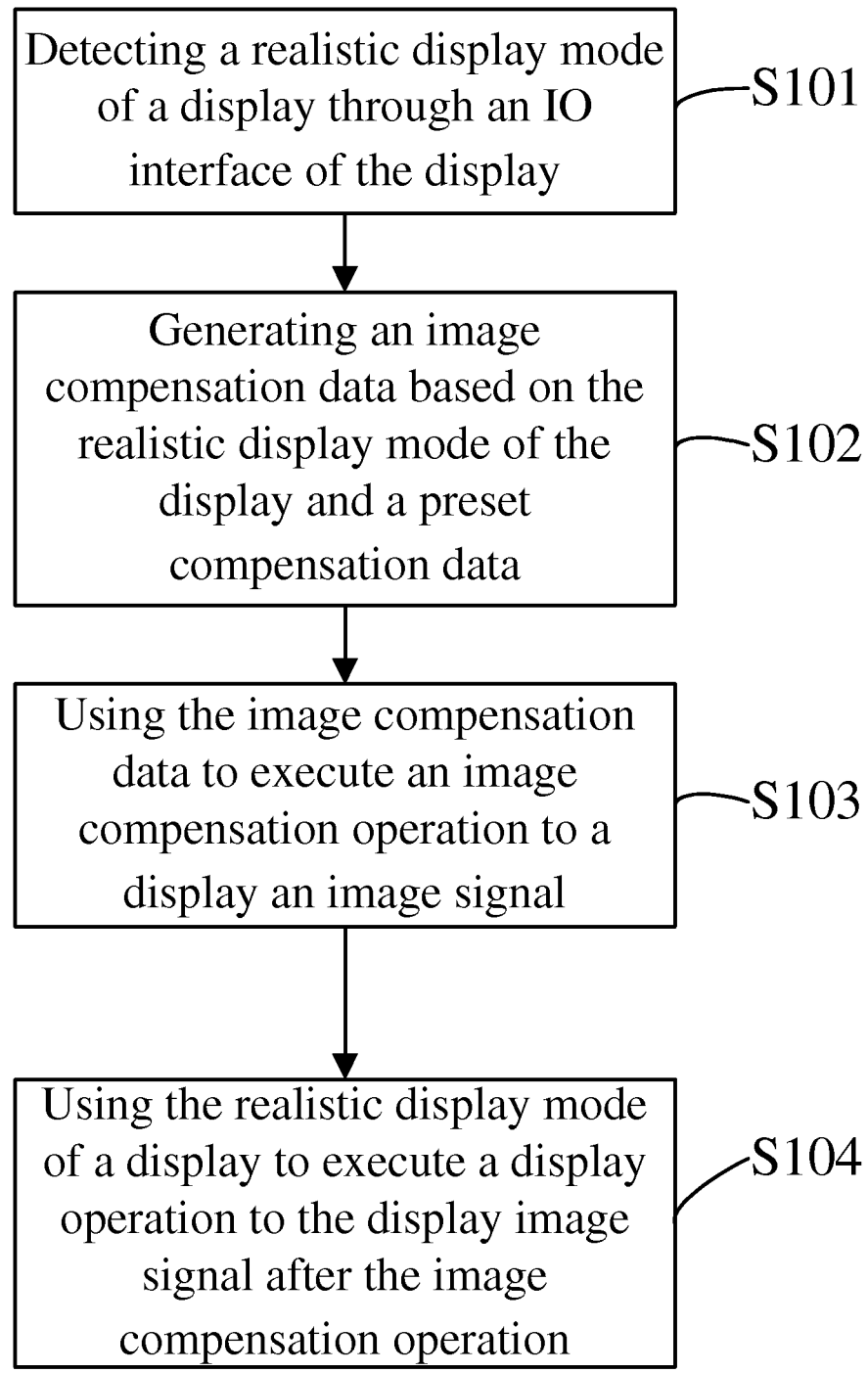
FIG. 1 is a flow diagram of an image compensation method of a preferred embodiment of the present invention.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention.

In the drawings, those units with similar structure are marked with the same labels.

The present invention provides an image compensation method used for LCDs (Liquid Crystal Display) or OLEDs (Organic Light-Emitting Diode). FIG. 1 is referred to a flow diagram of an image compensation method of a preferred embodiment of the present invention, the image compensation method comprising:

Step S101, detecting a realistic display mode of a display.

Step S102, generating an image compensation data based on the realistic display mode of the display and a preset compensation data.

Step S103, using the image compensation data to execute an image compensation operation on a display image signal.

Step S104, using the realistic display mode of a display to execute a display operation on the display image signal after the image compensation operation.

Below is the detailed description of the realized process of each step of the preferred embodiments of the image compensation method.

In step S101, an image compensation device is used to detect the realistic display mode of a display, such as a 2D display mode, different types of 3D display modes and so forth. The display refreshing rate of a 2D display mode is lower so that the resolution rate of the display image of the 2D display mode should be higher (under the same transmission rate). However, a 3D display mode needs to show a left-eye image and a right-eye image at the same time during a frame, or even shows a plurality of left-eye images and right-eye images to a plurality of users at the same time during a frame. So the display refreshing rate of a 3D display mode is higher, and the resolution rate of the display image of the 3D display mode is lower.

In step S102, an image compensation device generates an image compensation data based on a realistic display mode of the display and a preset compensation data, wherein the preset compensation data is a compensation data of the display image signal of the preset display mode of the display, and the image compensation data is a compensation data of the display image signal of the realistic display mode of the display. Generally, a preset display mode is a 2D display mode, the resolution rate of the display image of the 2D display mode is higher than the resolution rate of the display images of the other display modes. Hence, an image compensation device could process a preset compensation data and thereby generate an image compensation data, based on an image resolution rate of the realistic display mode of the display and an image resolution rate of the preset display mode of the display.

With reference to FIGS. 2A and 2B, the realized process of generating an image compensation data is disclosed herein. FIG. 2A shows a preset compensation data of an image compensation method of preferred embodiment of the present invention. FIG. 2B shows the preset compensation data of the an image compensation method of first preferred embodiment of the present invention. The refreshing rate of the preset display mode (2D display mode) is 60 Hz, the resolution rate of the preset display mode is 4 k*2 k. The refreshing rate of the realistic display mode is 240 Hz, the resolution rate of the realistic display mode is 4 k*0.5 k. The image resolution rate of the realistic display mode of the display is a quarter that of the image resolution rate of the preset display mode of the display; in other words, 4 pixels of 4 adjacent rows of the display of the preset display mode are used to show a pixel of the display of the realistic display mode. The image compensation data of the image display signal of the realistic display mode corresponds to 4 preset compensation data of the image display signal of the preset display mode. The corresponding image compensation data can be generated by executing a mean-value process to the 4 preset compensation data.

As shown in FIG. 2A, if a preset compensation data in the first row and the first column is 1, a preset compensation data in the second row and the first column is 2, a preset compensation data in the third row and the first column is 1, a preset compensation data in the fourth row and the first column is 1.25, then the whole image compensation data of the display image signal of the realistic display mode are generated as shown in FIG. 2B.

In step S103, the image compensation operation is executed on the display image signal by using the image compensation data derived in the step S102.

In step S104, after the image compensation operation, the realistic display mode of a display is used to execute a display operation on the display image signal.

Thus, the process of the image compensation of the image compensation method of the preferred embodiments of the present invention is completed.

The image compensation method of the preferred embodiments is used to generate the image compensation data of the realistic display mode, based on the realistic display mode of the display and a preset compensation data, so that the image compensation operation is able to be executed to the display images of all display modes of the display.

With reference to FIG. 1, FIG. 2A and FIG. 3, FIG. 3 shows the preset compensation data of an image compensation method of the second preferred embodiment of the present invention.

In step S102 of the preferred embodiment, the refreshing rate of the preset display mode is 60 Hz, and the resolution rate of the preset display mode is 4 k*2 k. The refreshing rate of the realistic display mode is 120 Hz, and the resolution rate of the realistic display mode is 4 k*1 k. The image resolution rate of the realistic display mode of the display is half that of the image resolution rate of the preset display mode of the display, in other words, 2 pixels of 2 adjacent rows of the display of the preset display mode are used to show a pixel of the display of the realistic display mode. The image compensation data of the image display signal of the realistic display mode corresponds to 2 preset compensation data of the image display signal of the preset display mode. The corresponding image compensation data can be generated by executing a mean-value process on the 2 preset compensation data.

As shown in FIG. 2A, a preset compensation data in the first row and the first column is 1, and a preset compensation data in the second row and the second column is 2. Hence if, as shown in FIG. 3, a preset compensation data in the first row and the first column is 1.5, then the whole image compensation data of the display image signal of the realistic display mode are generated as shown in FIG. 3.

The other steps of the preferred embodiment are the same as or similar to the first embodiment, the detail description of steps of the image compensation method of the first embodiment is disclosed above.

The image compensation method of the preferred embodiments is used to generate the image compensation data of the realistic display mode based on the realistic display mode of the display and a preset compensation data so that the image compensation operation is able to be executed to the display images of all display modes of the display.

With reference to FIG. 1, FIG. 2A, and FIG. 4, FIG. 4 is the preset compensation data of an image compensation method of third preferred embodiment of the present invention.

In step S102 of the preferred embodiment, the refreshing rate of the preset display mode is 60 Hz, and the resolution rate of the preset display mode is 4 k*2 k. The refreshing rate of the realistic display mode is 120 Hz, and the resolution rate of the realistic display mode is 4 k*1 k. The image resolution rate of the realistic display mode of the display is half that of the image resolution rate of the preset display mode of the display; in other words, 2 pixels of 2 adjacent rows of the display of the preset display mode are used to show a pixel of the display of the realistic display mode. The image compensation data of the image display signal of the realistic display mode corresponds to 2 preset compensation data of the image display signal of the preset display mode, any one of the preset compensation data of the display image signal of the preset display mode corresponding to the display image signal of the realistic display mode is selected as the image compensation data.

As FIG. 2A, a preset compensation data in the first row and the first column is 1, a preset compensation data in the first row and the second column is 2, a preset compensation data in the first row and the third column is 4, a preset compensation data in the first row and the fourth column is 3, a preset compensation data in the second row and the first column is 2, a preset compensation data in the second row and the second column is 5, a preset compensation data in the second row and the third column is 6, a preset compensation data in the second row and the fourth column is 4. In FIG. 4, the preset compensation data in the first row (odd rows) is chosen to be the image compensation data corresponding to the realistic display mode, and the preset compensation data in the second row (even rows) is abandoned. If, as shown in FIG. 4, a preset compensation data in the first row and the first column is 1, a preset compensation data in the first row and the second column is 2, a preset compensation data in the first row and the third column is 4, and a preset compensation data n the first row and the fourth column is 3, then the whole image compensation data of the display image signal of the realistic display mode are generated as shown in FIG. 4.

The other steps of the preferred embodiment are the same as or similar to the first embodiment; the detail description of steps of the image compensation method of the first embodiment is disclosed above.

The image compensation method of the preferred embodiments is used to generate the image compensation data of the realistic display mode, based on the realistic display mode of the display and a preset compensation data, so that the image compensation operation is able to be executed to the display images of all display modes of the display.

With reference to FIG. 1, FIG. 2A and FIG. 5, FIG. 5 shows the preset compensation data of an image compensation method of fourth preferred embodiment of the present invention.

In step S102 of the preferred embodiment, the refreshing rate of the preset display mode is 60 Hz, and the resolution rate of the preset display mode is 4 k*2 k. The refreshing rate of the realistic display mode is 120 Hz, and the resolution rate of the realistic display mode is 4 k*1 k. The image resolution rate of the realistic display mode of the display is half that of the image resolution rate of the preset display mode of the display; in other words, 2 pixels of 2 adjacent rows of the display of the preset display mode are used to show a pixel of the display of the realistic display mode. The image compensation data of the image display signal of the realistic display mode corresponds to 2 preset compensation data of the image display signal of the preset display mode, any one of the preset compensation data of the display image signal of the preset display mode corresponding to the display image signal of the realistic display mode is selected as the image compensation data.

As FIG. 2A, a preset compensation data in the first row and the first column is 1, a preset compensation data in the first row and the second column is 2, a preset compensation data in the first row and the third column is 4, a preset compensation data in the first row and the fourth column is 3, a preset compensation data in the second row and the first column is 2, a preset compensation data in the second row and the second column is 5, a preset compensation data in the second row and the third column is 6, and a preset compensation data in the second row and the fourth column is 4. In FIG. 5, the preset compensation data in the second row (even rows) is chosen to be the image compensation data corresponding to the realistic display mode, and the preset compensation data of the first row (odd rows) is abandoned. If, as shown in FIG. 5, a preset compensation data in the first row and the first column is 2, a preset compensation data in the first row and the second column is 5, a preset compensation data in the first row and the third column is 6, and a preset compensation data in the first row and the fourth column is 4, then the whole image compensation data of the display image signal of the realistic display mode are generated as shown in FIG. 5.

The other steps of the preferred embodiment are the same as or similar to the first embodiment; the detail description of steps of the image compensation method of the first embodiment is disclosed above.

The image compensation method of the preferred embodiments is used to generate the image compensation data of the realistic display mode based on the realistic display mode of the display and a preset compensation data so that the image compensation operation is able to execute to the display images of all display modes of the display.

Figure 6:
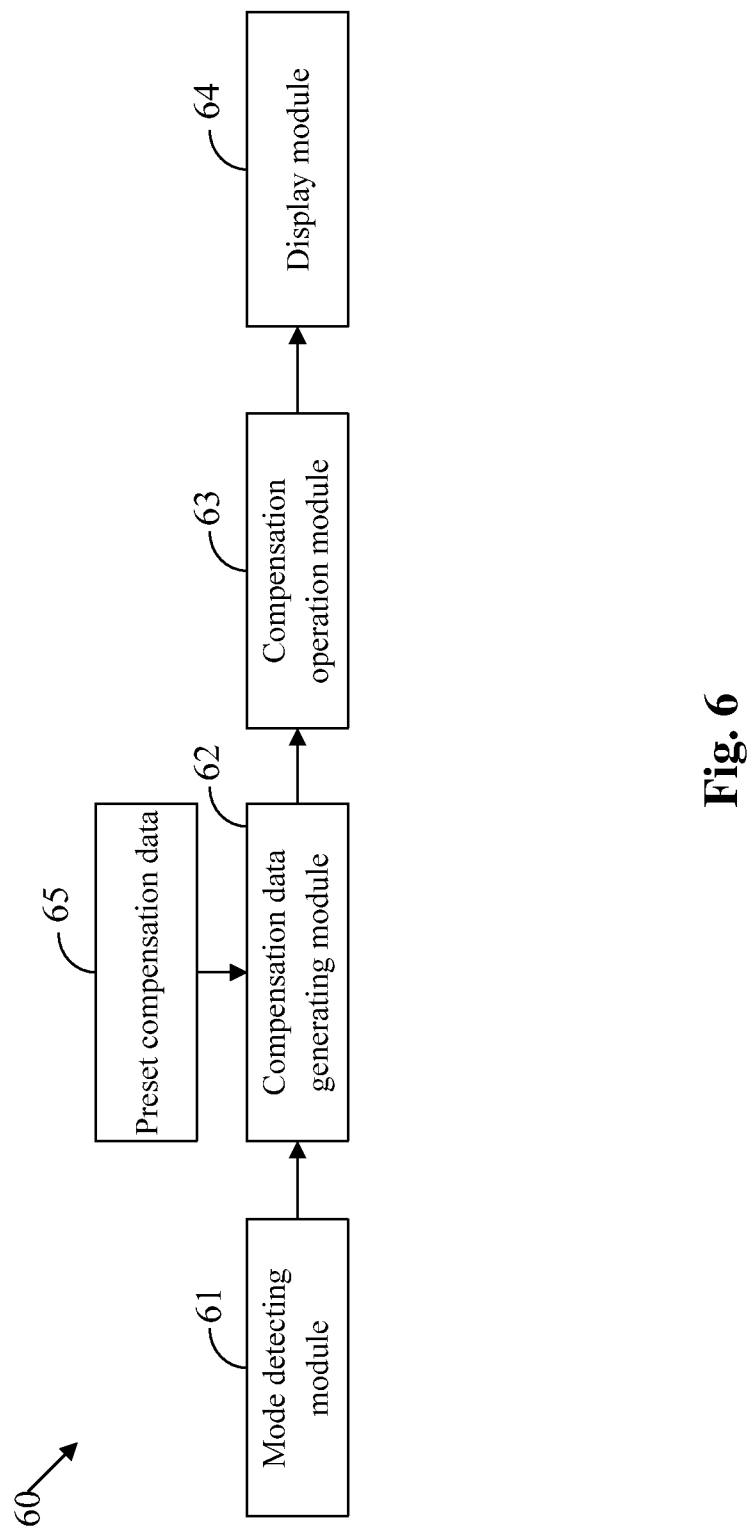
FIG. 6 is a structural drawing a display with image compensation according to a preferred embodiment of the present invention.

The present invention also provides a display with image compensation as referred to FIG. 6. FIG. 6 shows a structural drawing of a display with image compensation according to a preferred embodiment of the present invention. The display 60 with image compensation of the preferred embodiment comprises a mode detecting module 61, a compensation data generating module 62, a compensation operation module 63, and a display module 64.

The mode detecting module 61 is used to detect a realistic display mode of the display 60. The compensation data generating module 62 is used to generate an image compensation data based on the realistic display mode of the display 60 and the preset compensation data 65. The compensation operation module 63 is used to use the image compensation data to execute an image compensation operation on a display image signal. The display module 64 is used to use the realistic display mode of the display 60 to execute a display operation on the display image signal after the image compensation operation.

Preferably, the compensation data generating module 62 is configured to process the preset compensation data 65 and thereby generate the image compensation data based on an image resolution rate of the realistic display mode of the display and an image resolution rate of the preset display mode of the display.

While the image resolution rate of the realistic display mode of the display 60 is half or a quarter that of the image resolution rate of the preset display mode of the display 60, the compensation data generating module 62 executes a mean-value process to the preset compensation data of the display image signal of the preset display mode corresponding to the display image signal of the realistic display mode and thereby generates the image compensation data.

While the image resolution rate of the realistic display mode of the display 60 is half that of the image resolution rate of the preset display mode of the display 60, the compensation data generating module 62 selects any one of the preset compensation data 65 of the display image signal of the preset display mode corresponding to the display image signal of the realistic display mode to be as the image compensation data.

The other steps of the preferred embodiment are the same as or similar to the first embodiment. The detail description of steps of the image compensation method of the first embodiment is disclosed above.

With a specific embodiment, the working principle of the image compensation method and the display with image compensation of the present invention is explained.

First, while the display is ON, the image compensation device detects the realistic display mode of the display. The detection of the realistic display mode could be executed through an IO interface of the display. If an output of IO1/IO2 is 0/0, the realistic display mode is a 2D display mode. If an output of IO1/IO2 is 0/1, the realistic display mode is a 3D display mode with a half resolution rate of the 2D display mode. After deriving the realistic display mode of the display, the preset compensation data is read from a system storage unit.

Second, the preset compensation data is transformed into the image compensation data of the realistic display mode based on the realistic display mode of the display.

Third, the image compensation data is used to execute an image compensation operation to a display image signal.

Fourth, the realistic display mode of a display is used to execute a display operation to the display image signal after the image compensation operation.

In the image compensation method of the present invention, the image compensation device generates the image compensation data of the realistic display mode based on the realistic display mode of the display and the preset compensation data, so as to solve the technical problems of said prior art that the displays could not execute the image compensation to the display images of all display modes of the display.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. An image compensation method, comprising:
    detecting a realistic display mode of a display through an IO(Input-Output) interface of the display;
    processing a preset compensation data to generate an image compensation data, based on an image resolution rate of the realistic display mode of the display and an image resolution rate of a preset display mode of the display;
    using the image compensation data to execute an image compensation operation on a display image signal; and
    using the realistic display mode of a display to execute a display operation on the display image signal after the image compensation operation;
    wherein the preset compensation data is a compensation data of the display image signal of the preset display mode of the display.

2. The image compensation method according to claim 1, wherein the preset display mode is a 2D (2-dimensional) display mode, and a resolution rate of the 2D display mode of the display is higher than resolution rates of the other display modes.

3. The image compensation method according to claim 1, wherein the image resolution rate of the realistic display mode of the display is half that of the image resolution rate of the preset display mode of the display, a mean-value process is executed on the preset compensation data of the display image signal of the preset display mode corresponding to the display image signal of the realistic display mode and thereby generates the image compensation data.

4. The image compensation method according to claim 1, wherein the image resolution rate of the realistic display mode of the display is a quarter that of the image resolution rate of the preset display mode of the display, a mean-value process is executed on the preset compensation data of the display image signal of the preset display mode corresponding to the display image signal of the realistic display mode and thereby generates the image compensation data.

5. The image compensation method according to claim 1, wherein the image resolution rate of the realistic display mode of the display is half that of the image resolution rate of the preset display mode of the display, any one of the preset compensation data of the display image signal of the preset display mode corresponding to the display image signal of the realistic display mode is selected as the image compensation data.

6. An image compensation method, comprising:
    detecting a realistic display mode of a display;
    generating an image compensation data based on the realistic display mode of the display and a preset compensation data;
    using the image compensation data to execute an image compensation operation on a display image signal; and
    using the realistic display mode of a display to execute a display operation on the display image signal after the image compensation operation;
    wherein the preset compensation data is a compensation data of the display image signal of a preset display mode of the display.

7. The image compensation method according to claim 6, wherein the preset compensation data is a compensation data of the display image signal of the preset display mode of the display.

8. The image compensation method according to claim 7, wherein the step of generating the image compensation data comprises:
    processing the preset compensation data to generate the image compensation data, based on an image resolution rate of the realistic display mode of the display and an image resolution rate of the preset display mode of the display.

9. The image compensation method according to claim 8, wherein the preset display mode is a 2D (2-dimensional) display mode, a resolution rate of the 2D display mode of the display is higher than resolution rates of the other display modes.

10. The image compensation method according to claim 8, wherein the image resolution rate of the realistic display mode of the display is half that of the image resolution rate of the preset display mode of the display, a mean-value process is executed on the preset compensation data of the display image signal of the preset display mode corresponding to the display image signal of the realistic display mode and thereby generates the image compensation data.

11. The image compensation method according to claim 8, wherein the image resolution rate of the realistic display mode of the display is a quarter that of the image resolution rate of the preset display mode of the display, a mean-value process is executed on the preset compensation data of the display image signal of the preset display mode corresponding to the display image signal of the realistic display mode and thereby generates the image compensation data.

12. The image compensation method according to claim 8, wherein the image resolution rate of the realistic display mode of the display is half that of the image resolution rate of the preset display mode of the display, any one of the preset compensation data of the display image signal of the preset display mode corresponding to the display image signal of the realistic display mode is selected as the image compensation data.

13. A display with image compensation, comprising:
a mode detecting module configured to detect a realistic display mode of the display;
a compensation data generating module configured to generate an image compensation data based on the realistic display mode of the display and a preset compensation data;
a compensation operation module configured to use the image compensation data to execute an image compensation operation to a display image signal;
a display module configured the realistic display mode of the display to execute a display operation to the display image signal after the image compensation operation.

14. A display with image compensation according to claim 13, wherein the preset compensation data is a compensation data of the display image signal of the preset display mode of the display.

15. A display with image compensation according to claim 14, wherein the compensation data generating module is configured to process the preset compensation data to generate the image compensation data based on an image resolution rate of the realistic display mode of the display and an image resolution rate of the preset display mode of the display.

16. A display with image compensation according to claim 15, wherein the preset display mode is a 2D (2-dimensional) display mode, a resolution rate of the 2D display mode of the display is higher than resolution rates of the other display modes.

17. A display with image compensation according to claim 15, wherein the image resolution rate of the realistic display mode of the display is half that of the image resolution rate of the preset display mode of the display, a mean-value process is executed on the preset compensation data of the display image signal of the preset display mode corresponding to the display image signal of the realistic display mode and thereby generates the image compensation data.

18. A display with image compensation according to claim 15, wherein the image resolution rate of the realistic display mode of the display is a quarter that of the image resolution rate of the preset display mode of the display, a mean-value process is executed on the preset compensation data of the display image signal of the preset display mode corresponding to the display image signal of the realistic display mode and thereby generates the image compensation data.

19. A display with image compensation according to claim 15, wherein the image resolution rate of the realistic display mode of the display is half that of the image resolution rate of the preset display mode of the display, any one of the preset compensation data of the display image signal of the preset display mode corresponding to the display image signal of the realistic display mode is selected as the image compensation data.

* * * * *